(12) United States Patent
Watanabe

(10) Patent No.: US 10,666,651 B2
(45) Date of Patent: May 26, 2020

(54) ACCESS CONTROL SYSTEM

(71) Applicant: Allied Telesis Holdings K.K., Tokyo (JP)

(72) Inventor: Mitsuhiro Watanabe, Tokyo (JP)

(73) Assignee: ALLIED TELESIS HOLDINGS K.K., Tokyo (JP)

( * ) Notice: Subject to any disclaimer, the term of this patent is extended or adjusted under 35 U.S.C. 154(b) by 177 days.

(21) Appl. No.: 15/966,957

(22) Filed: Apr. 30, 2018

(65) Prior Publication Data
US 2018/0324180 A1    Nov. 8, 2018

(30) Foreign Application Priority Data

May 2, 2017 (JP) .................................. 2017-091605

(51) Int. Cl.
| | | |
|---|---|---|
| *G06F 9/00* | (2006.01) | |
| *G06F 15/16* | (2006.01) | |
| *G06F 17/00* | (2019.01) | |
| *H04L 29/06* | (2006.01) | |
| *H04L 12/58* | (2006.01) | |

(Continued)

(52) U.S. Cl.
CPC ...... *H04L 63/0876* (2013.01); *H04L 41/0213* (2013.01); *H04L 41/0681* (2013.01); *H04L 51/046* (2013.01); *H04L 51/12* (2013.01); *H04L 51/22* (2013.01); *H04L 63/0227* (2013.01);

(Continued)

(58) Field of Classification Search
CPC ............. H04L 63/0876; H04L 41/0213; H04L 51/046; H04L 51/12; H04L 51/22; H04L 63/0227; H04L 63/0272; H04L 63/1425; H04L 12/4641
See application file for complete search history.

(56) References Cited

U.S. PATENT DOCUMENTS

| | | | | |
|---|---|---|---|---|
| 8,856,257 B1 * | 10/2014 | Zhang | ................. | G06F 11/3006 709/207 |
| 2003/0188191 A1 * | 10/2003 | Aaron | ................. | H04L 63/0227 726/23 |

(Continued)

FOREIGN PATENT DOCUMENTS

JP    2015127843 A    7/2015

*Primary Examiner* — John B King
*Assistant Examiner* — Darshan I Dhruv
(74) *Attorney, Agent, or Firm* — Brooks Acordia IP Law, PC; Michael Zarrabian

(57) ABSTRACT

To provide an access control system for performing access control, etc., in a case of detecting irregular behavior in a network, an access control system includes a message-obtainment-processing unit configured to obtain from an email server an email message including information for identifying a suspect-terminal that has conducted irregular behavior, the email message being generated in a security system located inside or outside a private network constituted by use of a software defined network (SDN) to be received by the email server. The message-obtainment-processing unit causes an SDN controller in the private network to provide, to the suspect-terminal or an edge network device that controls communication of the suspect-terminal, a control instruction based on the obtained email message, so as to cause the suspect-terminal or the edge network device to execute a process for access control against the suspect-terminal.

10 Claims, 10 Drawing Sheets

(51) Int. Cl.
*H04L 12/24* (2006.01)
*H04L 12/46* (2006.01)

(52) U.S. Cl.
CPC ...... *H04L 63/0272* (2013.01); *H04L 63/1425* (2013.01); *H04L 12/4641* (2013.01)

(56) References Cited

U.S. PATENT DOCUMENTS

| | | | |
|---|---|---|---|
| 2007/0261112 A1* | 11/2007 | Todd | G06F 21/577 726/11 |
| 2012/0005743 A1* | 1/2012 | Kitazawa | H04L 63/1425 726/13 |
| 2017/0223034 A1* | 8/2017 | Singh | H04L 43/062 |
| 2017/0237733 A1* | 8/2017 | Osaki | H04L 51/24 726/4 |
| 2017/0339172 A1* | 11/2017 | Mahadevia | H04L 63/0263 |

\* cited by examiner

FIG. 7A

<sss> | MSG IDENTIFICATION=xx_system | From: xxx@aaa.com | Subject: THREAT DETECTED | AUTHENTICATED USER NAME: yamada | GROUP NAME: SALES DIVISION | IP ADDRESS: 192.168.1.100 | URL CATEGORY: THREAT INFORMATION SITE | URL: http://xxxx.com/ | SUBJECT PERSON: yyy SALES DIVISION | PROCESS TIME: Fri Feb 10 12:34:56 2017

FIG. 7B

SPECIFYING INFORMATION TO REFER TO
BASED ON THE VALUE OF MSG IDENTIFICATION

<sss> | MSG IDENTIFICATION=xx_system | From: xxx@aaa.com | Subject: THREAT DETECTED | AUTHENTICATED USER NAME: yamada | GROUP NAME: SALES DIVISION | IP ADDRESS: 192.168.1.100 | URL CATEGORY: THREAT INFORMATION SITE | URL: http://xxxx.com/ | SUBJECT PERSON: yyy SALES DIVISION | PROCESS TIME: Fri Feb 10 12:34:56 2017

INFORMATION SPECIFIED TO REFER TO     INFORMATION SPECIFIED TO REFER TO

FIG. 8A

<<xxx>> | MSG IDENTIFICATION=Mail_API | From: xxx@aaa.com | Subject: ip=10.0.1.2 | action=BLOCK

SPECIFYING INFORMATION TO REFER TO, BASED ON THE VALUE OF MSG IDENTIFICATION

INFORMATION SPECIFIED TO REFER TO

FIG. 8B

<<xxx>> | MSG IDENTIFICATION=Mail_API | From: xxx@aaa.com | Subject: device=PC-xxxx | action=ISOLATE

FIG. 8C

<<xxx>> | MSG IDENTIFICATION=Mail_API | From: xxx@aaa.com | Subject: device=PC-xxxx | action=UNBLOCK

ACCESS CONTROL SYSTEM

CROSS REFERENCE TO RELATED APPLICATION

The present application claims priority under 35 U.S.C. § 119 to Japanese Application No. 2017-091605 filed May 2, 2017, the entire content of which is incorporated herein by reference.

BACKGROUND

Field of the Invention

The present invention relates to an access control system for performing access control, etc., in a case of detecting irregular behavior of a device connected to a network.

Description of the Related Documents

In an organization (hereinafter referred to as an "organization, etc.") such as a company or a government/municipal office, multiple computers are used in a daily operation, and the computers are connected with each other via a network inside the organization, etc. Furthermore, for the purpose of preventing an unauthorized attack such as an unauthorized access from outside the network of the organization, etc., it is common to take steady security measures.

In a case of detecting irregular communication associated with an unauthorized attack, etc., blocking by means of access control, etc., is performed to prevent damage caused by the irregular communication from spreading. In a conventional method for performing such access control as above, occurrence of irregular communication is notified by a computer that controls and manages a network by use of syslog or Simple Network Management Protocol (SNMP) traps, so that, based on the notification, a predetermined network relaying device such as a router performs access control such as blocking of communication. An example of such conventional access control as above is disclosed in Japanese Unexamined Patent Application Publication No. 2015-127843.

As disclosed in Japanese Unexamined Patent Application Publication No. 2015-127843, regarding syslog and SNMP traps, it is common that notification is provided through User Datagram Protocol (UDP) communication. In UDP communication, notification is transmitted in a unilateral way without ensuring arrival of the notification. Therefore, there is a problem in terms of security, i.e., in a case where notification has not arrived, access control cannot be performed.

Furthermore, in a case where a computer that controls and manages a network is outside the network of the organization, etc., it is often not easy with syslog or SNMP traps to perform communication with a network device such as a router provided in the network inside the organization, etc. Therefore, there is a need for solutions such as to prepare a virtual private network (VPN) environment, to make a hole in a firewall, and to check correspondence between a global IP address and a private IP address. Although it is possible to attend to the above problem by means of the above solutions, it is further needed to improve a system for attending to the problem, which involves economic cost. Furthermore, there is a concern in terms of security because there is a need to make a hole in a firewall.

SUMMARY

In view of the above problem, the inventor of the present invention has invented an access control system in which, in a case of detecting irregular behavior, it is possible to attend to the irregular behavior in a simple way while ensuring security.

The first aspect of the present invention is an access control system for performing access control in a private network. The access control system includes: a message-obtainment-processing unit configured to obtain from a message server a message including information for identifying a suspect-terminal, the message being generated in a security system located inside or outside the private network to be received by the message server. The message-obtainment-processing unit causes a computer that controls communication in the private network to provide, to the suspect-terminal or a computer that controls communication of the suspect-terminal, a control instruction based on the obtained message, so as to cause the suspect-terminal or the computer that controls communication of the suspect-terminal to execute a process for access control against the suspect-terminal. The message is a message of a messaging service by use of a port that is permitted to pass through a firewall of the private network.

Regarding the first aspect of the present invention, it is possible that the access control system is an access control system for performing access control in a private network constituted by use of a software defined network (SDN). The access control system includes: a message-obtainment-processing unit configured to obtain from an email server an email message including information for identifying a suspect-terminal, the email message being generated in a security system located inside or outside the private network to be received by the email server. The message-obtainment-processing unit causes an SDN controller in the private network to provide, to the suspect-terminal or an edge network device that controls communication of the suspect-terminal, a control instruction based on the obtained email message, so as to cause the suspect-terminal or the edge network device to execute a process for access control against the suspect-terminal.

Conventionally, due to access limitation by a firewall provided in a private network, there has been a need for a solution for permitting communication of syslog or SNMP traps, such as preparing a VPN environment. On the other hand, it is common that an email is utilized in a private network of an organization, etc. That is to say, access limitation by a firewall is not imposed on email messages. Therefore, as described in the above aspect of the present invention, by utilizing an email message for providing an SDN controller with information of a suspect-terminal, such a solution as preparing a VPN environment is not needed any more. Furthermore, in contrast to UDP communication, which is often used for syslog or SNMP traps, notification is provided with an email message. Therefore, possibility of successfully delivering notification is enhanced, compared to conventional ways.

Regarding the above aspect of the present invention, it is possible to configure the access control system such that: the email message is partially or entirely written in a code that is not processable for the SDN controller; and the message-obtainment-processing unit converts the obtained email message into information that is processable for the SDN controller and then causes the SDN controller to provide, to the suspect-terminal or the edge network device, a control instruction corresponding to the information converted into, so as to cause the suspect-terminal or the edge network device to execute the process for access control against the suspect-terminal.

In an email message in Japan, a multi-byte character code is used for a part or the entirety of the email message. Multi-byte characters are not processable for some SDN controllers. Therefore, such an SDN controller cannot provide a control instruction to a suspect-terminal or an edge network device even though the SDN controller obtains an email message in such a multi-byte character code. Hence, by converting into information that is processable to the SDN controller, it is possible to provide a control instruction from the SDN controller.

Regarding the above aspect of the present invention, it is possible to configure the access control system such that: the email message further includes information indicative of control content for the process for access control; and the message-obtainment-processing unit provides, to the suspect-terminal or the edge network device, a control instruction corresponding to the control content.

Regarding the above aspect of the present invention, it is possible to configure the access control system such that: the email message further includes information indicative of an irregular state of the suspect-terminal; and the message-obtainment-processing unit specifies control content corresponding to the information indicative of the irregular state for the process for access control and provides, to the suspect-terminal or the edge network device, a control instruction corresponding to the control content.

By including, in an email message, information indicative of control content or information indicative of an irregular state, as described in the above aspects of the present invention, it is possible to provide a control instruction in accordance with the information. Therefore, it is possible to enhance variety of the process for access control.

Regarding the first aspect of the present invention, it is possible that the access control system is an access control system for performing access control in a private network constituted by use of an SDN. The access control system includes: a security system located inside or outside the private network and configured to, when irregular behavior in the private network is detected, specify a user terminal that has conducted the irregular behavior as a suspect-terminal and generate an email message including identification information of the suspect-terminal; an email server configured to store the email message sent from the security system; an SDN controller configured to control communication in the private network and provided with a message-obtainment-processing unit configured to obtain the email message stored in the email server; and an edge network device configured to control communication of the suspect-terminal. The message-obtainment-processing unit causes the SDN controller to provide, to the suspect-terminal or the edge network device, a control instruction based on the obtained email message, so as to cause the suspect-terminal or the edge network device to execute a process for access control against the suspect-terminal.

Regarding the first aspect of the present invention, it is possible that the access control system is an access control system for performing access control in a private network constituted by use of an SDN. The access control system includes: a security system configured to, when irregular behavior in the private network is detected, specify a user terminal that has conducted the irregular behavior as a suspect-terminal and accept, from a predetermined person who administers the private network, generation of an email message including identification information of the specified suspect-terminal; an email server configured to store the email message sent from the security system; an SDN controller configured to control communication in the private network and provided with a message-obtainment-processing unit configured to obtain the email message stored in the email server; and an edge network device configured to control communication of the suspect-terminal. The message-obtainment-processing unit causes the SDN controller to provide, to the suspect-terminal or the edge network device, a control instruction based on the obtained email message, so as to cause the suspect-terminal or the edge network device to execute a process for access control against the suspect-terminal.

With such a configuration as each of the above aspects of the present invention, it is possible to achieve the same technical effect as the first aspect of the present invention.

Regarding the above aspect of the present invention, it is possible to configure the access control system such that: the message-obtainment-processing unit specifies, based on sender information in the obtained email message, the security system from which the email message has been sent; the message-obtainment-processing unit inserts information for identifying the specified security system into a syslog message, which is converted into based on the email message; the SDN controller refers to information in the syslog message, based on the information for identifying the security system, the information for identifying the security system being in the syslog message; and the SDN controller provides the control instruction, based on the referred information.

In an organization, etc., such as a company, multiple security systems are utilized in a multi-layered format. Further, conventionally, in a case where irregular behavior of some kind is detected with respect to a user terminal, notification is provided to a predetermined administrator via an email. In addition, messages of the email differ, depending on security systems. In the access control system according to the above aspect of the present invention, such notification via an email is obtained by a member, in addition to or instead of a predetermined administrator, and is utilized by an SDN controller for controlling a suspect-terminal or an edge network device. Therefore, regarding a syslog message that is converted on the basis of the email message, it is necessary that a message-obtainment-processing unit, which obtains the notification, specifies information to refer to in the syslog message, based on information for identifying a security system. Here, with the configuration according to the above aspect of the present invention, it is possible to execute such a process as above.

The technology for constituting the private network is not limited to SDN. Further, there is not such limitation as using an email message, as long as using a message of a messaging service that utilizes a port that is permitted to pass through the firewall. Therefore, with the above aspect of the present invention, it is possible to achieve the same technical effect as the first aspect of the present invention.

The eighteenth aspect of the present invention is a non-transitory computer-readable recording medium storing a computer program that causes a computer to function as a message-obtainment-processing unit configured to obtain from an email server an email message including information for identifying a suspect-terminal, the email message being generated in a security system located inside or outside a private network, which is constituted by use of an SDN, to be received by the email server. The message-obtainment-processing unit causes an SDN controller in the private network to provide, to the suspect-terminal or an edge network device that controls communication of the suspect-terminal, a control instruction based on the obtained email message, so as to cause the suspect-terminal or the edge network device to execute a process for access control against the suspect-terminal.

It is possible to cause a computer to read and execute the computer program according to the above aspect of the present invention, so as to configure the first aspect of the present invention. Further, it is possible to achieve the same technical effect as the first aspect of the present invention.

The nineteenth aspect of the present invention is an access control method for performing access control in a private network constituted by use of an SDN. The access control method includes: when a security system located inside or outside the private network detects irregular behavior in the private network, specifying a user terminal that has conducted the irregular behavior as a suspect-terminal and generating an email message including identification information of the suspect-terminal; storing the generated email message in an email server; causing an SDN controller or a predetermined computer, which controls communication in the private network, to obtain the email message stored in the email server; partially or entirely converting the obtained email message from a code that is not processable for the SDN controller into information that is processable for the SDN controller; providing, from the SDN controller to the suspect-terminal or an edge network device that controls communication of the suspect-terminal, a control instruction corresponding to the information converted into; and causing the suspect-terminal or the edge network device to execute a process for access control against the suspect-terminal, based on the control instruction.

It is possible to utilize a computer to execute the access control method according to the above aspect of the present invention, so as to achieve the same technical effect of the first aspect of the present invention.

By use of the present invention, it is possible to provide an access control system in which, in a case of detecting irregular behavior, it is possible to attend to the irregular behavior in a simple way while ensuring security.

BRIEF DESCRIPTION OF THE DRAWINGS

FIG. 6A is a diagram illustrating an example of an email message transmitted by an observation center computer;

FIG. 6B is a diagram illustrating an example of an email message transmitted by the observation center computer;

FIG. 6C is a diagram illustrating an example of an email message transmitted by the observation center computer;

FIG. 6D is a diagram illustrating an example of an email message transmitted by the observation center computer;

FIG. 6E is a diagram illustrating an example of an email message transmitted by the observation center computer;

FIG. 6F is a diagram illustrating an example of an email message transmitted by the observation center computer;

FIG. 7A is a diagram illustrating an example of a syslog message converted from the email message of FIG. 5;

FIG. 7B is a diagram illustrating an example of the syslog message converted from the email message of FIG. 5;

FIG. 8A is a diagram illustrating an example of a syslog message converted from either one of the email message of FIG. 6A and the email message of FIG. 6D;

FIG. 8B is a diagram illustrating an example of a syslog message converted from either one of the email message of FIG. 6B and the email message of FIG. 6E;

FIG. 8C is a diagram illustrating an example of a syslog message converted from either one of the email message of FIG. 6C and the email message of FIG. 6F;

DETAILED DESCRIPTION

Figure 1:
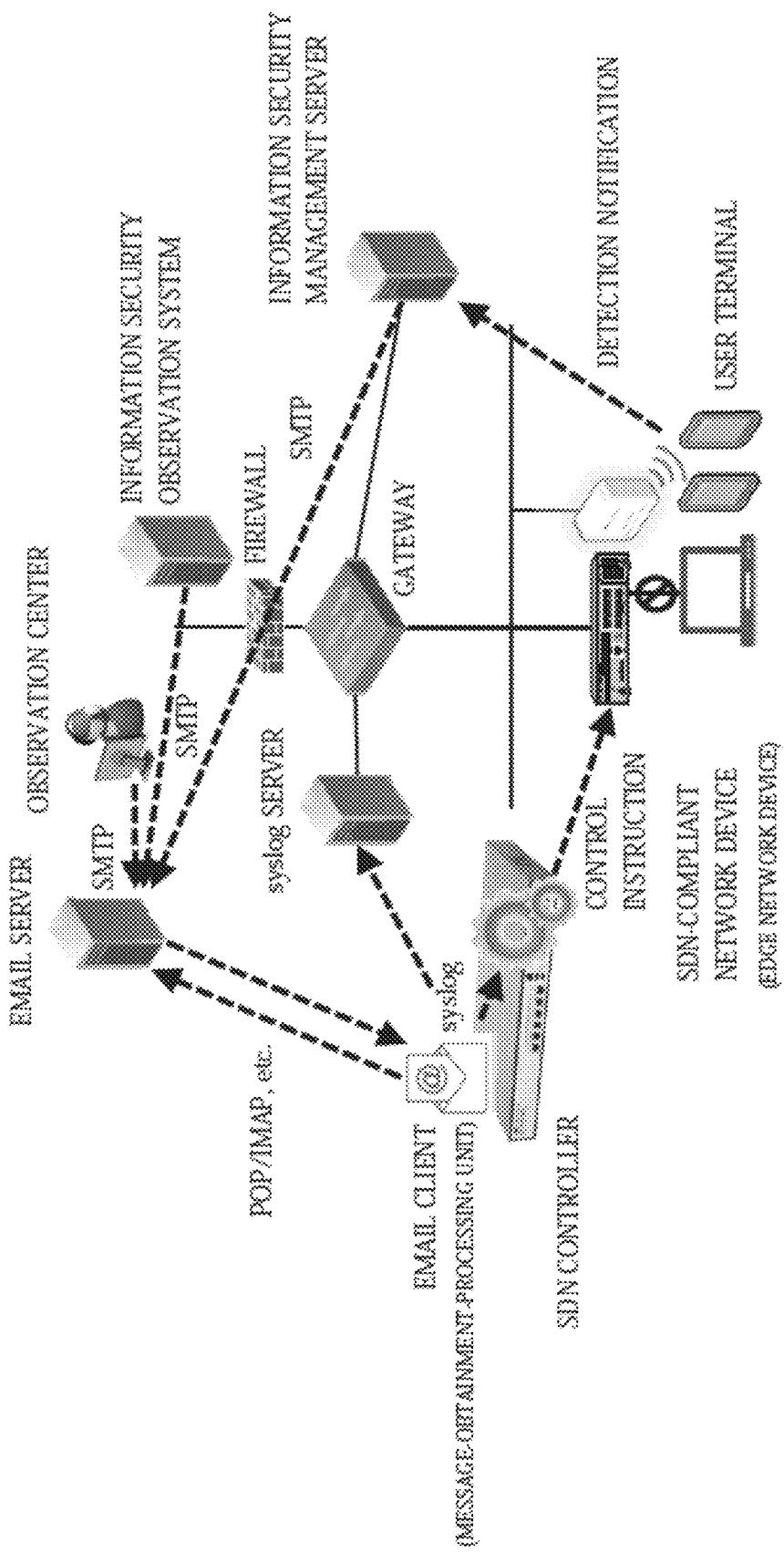
FIG. 1 is a diagram schematically illustrating an example of an overview of the entirety of an access control system according to the present invention.

In FIG. 1, an example of an overview of the entirety of an access control system 1 according to the present invention is schematically illustrated. Furthermore, FIG. 1 is a diagram illustrating an example of the entire configuration of the access control system 1 according to the present invention.

The access control system 1 is a computer system for observing a network of an organization, etc., and a computer in the network. The access control system 1 includes a gateway 2, a software defined network (SDN) controller 3, a security system 6, a syslog server 7, an edge network device 4, a user terminal 5, an email server 8, etc.

Figure 3:
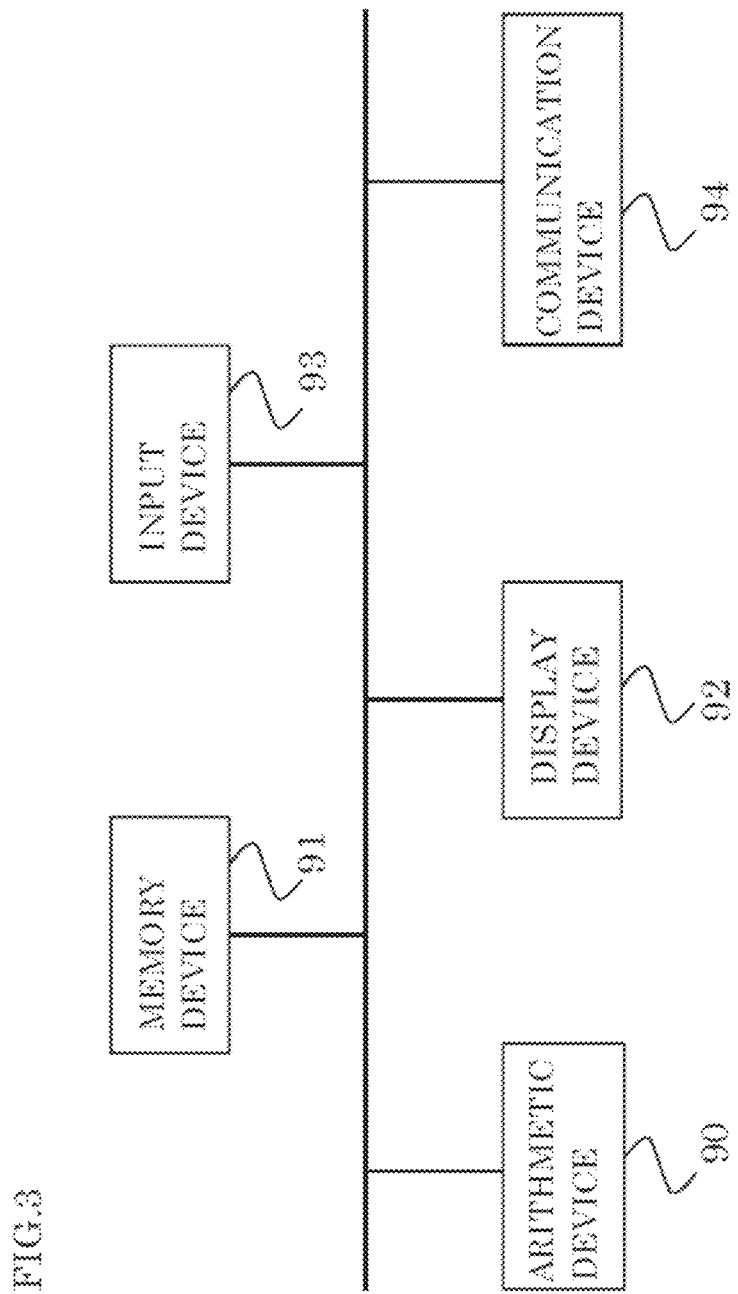
FIG. 3 is a diagram schematically illustrating an example of the hardware configuration of a computer used in the access control system according to the present invention.

The gateway 2, the SDN controller 3, the security system 6, the syslog server 7, the edge network device 4, the user terminal 5, and the email server 8 in the access control system 1 are actualized by various types of computers, e.g., a server, a personal computer, and a portable communication terminal such as a cellular phone (including a smartphone), etc. In FIG. 3, an example of the hardware configuration of a computer is illustrated. A computer includes: an arithmetic device 90 for performing arithmetic processing of a program, such as a central processing unit (CPU); a memory device 91 for storing information, such as a random-access memory (RAM) or a hard disk; a display device 92 such as a display; an input device 93 such as a keyboard or a pointing device (e.g., a mouse, a numeric keypad, etc.); and a communication device 94 for transmitting and receiving a processing result of the arithmetic device 90 and information stored in the memory device 91 via a network such as the internet or a local area network (LAN).

Although each diagram illustrates a case in which each computer is actualized by a single computer, the functions may be separately arranged in multiple computers. Each unit according to the present invention is merely differentiated on the basis of each function in a logical sense. Therefore, it is possible that some units are physically or substantially created in the same region.

A network (i.e., a private network) inside an organization, etc., is a closed network, and a network outside the organization, etc., is an open network such as the internet. The below-described observation computer 6b, observation center computer 6c, email server 8, etc., which are in a network outside, may be in a cloud network.

The gateway 2 is a computer placed between the network (i.e., the private network) inside the organization, etc., and a network (e.g., the internet) outside the organization, etc. The gateway 2 includes a function as a firewall, etc., for preventing an unauthorized attack such as an unauthorized access from the open network to the private network. For example, the gateway 2 may be, but is not limited to, a router.

In the private network, a network management technology by use of an SDN is employed, in which communication is controlled by the SDN controller 3. The SDN controller 3 manages communication in a network constituted by use of an SDN. The SDN controller 3 is software for controlling and managing a network. Further, the SDN controller 3 operates when the software is executed on a computer. In the present specification, the SDN controller 3 is a collective term including the SDN controller 3, as the software, and the computer on which the software is operated. In a case of utilizing OpenFlow as an SDN, an OpenFlow controller is the SDN controller 3.

Regarding the private network of the network constituted by use of an SDN, a user terminal 5 used by a user who belongs to the organization, etc., is connected to the private network via an edge network device 4. An edge network device 4 is a network device for forwarding data and is connected to a user terminal 5 as an edge of communication. In an edge network device 4, a rule table (i.e., a flow table) that indicates a rule as to how to control a packet received from a user terminal 5 is stored, so as to process the packet on the basis of the rule table. Furthermore, in a case where the rule is not stored in the rule table, a process of the packed is put on hold. Then, a query is provided to the SDN controller 3, in order to process the packed that has been on hold, based on a control instruction from the SDN controller 3. Furthermore, depending on conditions, the packet is transmitted to the SDN controller 3 and is rewritten, etc., by the SDN controller 3, so as to receive and process the rewritten packed from the SDN controller 3. In a case where the technology and the protocol of OpenFlow are utilized as an SDN, an OpenFlow switch functions as an edge network device 4.

The SDN controller 3 includes a message-obtainment-processing unit that obtains an email message stored in a mailbox of the email server 8 and utilizes the message for performing access control of a suspect-terminal or an edge network device 4 that controls the suspect-terminal. It is common that an email message is written in a code (i.e., a character code) that is not processable (i.e., impossible to be processed) for an SDN controller 3. Therefore, the message-obtainment-processing unit performs conversion into a code (i.e., a character code) that is processable (i.e., possible to be processed) for an SDN controller 3, so as to generate a syslog message for performing access control of a suspect-terminal or an edge network device 4.

A user terminal 5, which is a computer used by a user who belongs to the organization, etc., may be a personal computer or a portable communication terminal such as a cellular phone or a tablet computer.

The security system 6, which is inside or outside the private network, detects an unauthorized attack by a computer virus, malware, ransomware, etc., and detects irregular behavior in a network (e.g., behavior that is different from regular behavior of a computer properly connected to the private network, such as irregular communication, infection with a computer virus, or an irregular access operation) such as connection to the private network by an improper brought-in computer that should not be accepted to connect to the private network. In response to detecting irregular behavior, a user terminal 5 that is conducting the irregular behavior is set to a suspect-terminal. Further, identification information such as an IP address, a MAC address, etc., of the suspect-terminal, information indicative of a cause of irregular-behavior detection, and an email message including control content provided to the suspect-terminal or an edge network device 4 that manages the suspect-terminal are generated and sent to a predetermined email address. Note that the security system 6 may receive, from another computer in the private network, information indicative of detection of irregular behavior. Furthermore, an email address used by the message-obtainment-processing unit, which is provided in the SDN controller 3 or the below-described mailing computer 9, for sending and receiving an email is set as a sending-destination.

The security system 6 may be a predetermined computer system or computer program, which is actualized by an observation computer 6a provided inside the private network, an observation computer 6b provided outside the private network, an observation center computer 6c, which is a computer used at a manned observation center that observes the private network of the organization, etc. The security system 6 may be independent as a single computer system or may be a computer program such as anti-virus software provided in a user terminal 5. The security system 6 may not include all of the observation computer 6a, the observation computer 6b, and the observation center computer 6c. That is to say, the security system 6 should include at least one of the observation computer 6a, the observation computer 6b, and the observation center computer 6c.

To each member of the security systems 6, an email address is assigned in advance. In response to irregular behavior of a user terminal 5, normally, notification is provided to an administrator of the private network via an email by use of the email address. In the access control system 1 according to the present invention, notification is provided to a predetermined email address, in addition to or instead of the notification to the administrator. It is preferable that an email sent by the security system 6 includes information of a search engine, a category of threat detection, a cause of detection, information of a suspect-terminal, information of an unauthorized action conducted by a suspect-terminal, etc. However, there is no such limitation as above, and there may be difference depending on security systems 6.

The observation computer 6a, which is in the private network, observes communication in the private network and detects irregular behavior of a user terminal 5. In response to detection of irregular behavior, identification information such as an IP address, a MAC address, etc., of the computer (i.e., the suspect-terminal) that is conducting the irregular behavior, information indicative of a cause of irregular-behavior detection, and an email message including control content provided to the suspect-terminal or an edge network device 4 that manages the suspect-terminal are generated and sent to a predetermined email address.

The observation computer 6b, which is outside the private network, observes communication between the private network and a global network and detects irregular behavior of a user terminal 5 associated with an unauthorized attack from a global network such as the internet. In response to detection of irregular behavior, an email message including network identification information such as an IP address, a MAC address, etc., of the computer (i.e., the suspect-terminal) that is conducting the irregular behavior is generated and sent to a predetermined email address.

The observation center computer 6c, which is a computer used at a manned observation center that observes the private network of the organization, etc., and may be inside or outside the private network, observes communication between the private network and a global network. Furthermore, the observation center computer 6c detects irregular behavior of a user terminal 5 associated with an unauthorized attack from a global network such as the internet. In response to detection of irregular behavior, an email message including network identification information such as an IP address, a MAC address, etc., of the computer (i.e., the suspect-terminal) that is conducting the irregular behavior is generated through a predetermined operation provided by a person who administers the observation center computer 6c and sent to a predetermined email server 8.

The syslog server 7 is a server that stores a log message (i.e., syslog).

It is preferable that each of the gateway 2, the SDN controller 3, the edge network devices 4, and the observation computer 6a, which are in the private network, is a computer that functions as Unified Threat Management (UTM). However, there is no such limitation as above.

First Embodiment

Figure 4:
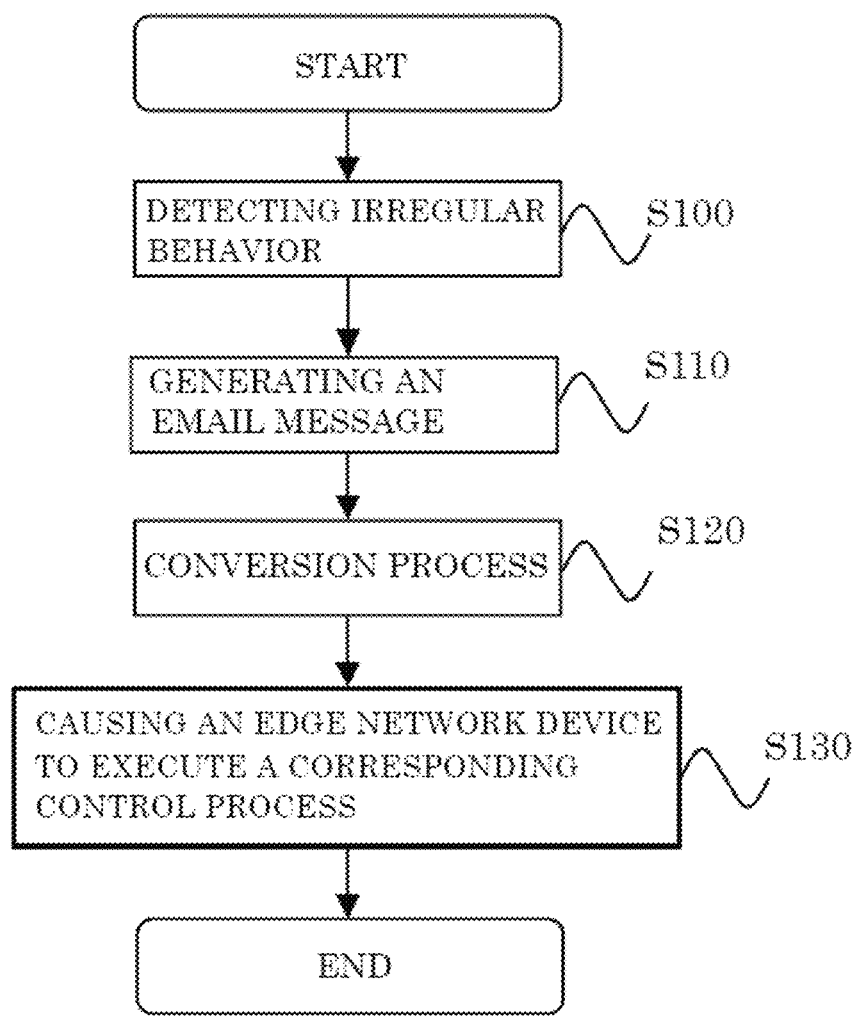
FIG. 4 is a flowchart illustrating an example of a processing process performed in the access control system according to the present invention.

The following description explains an example of a processing process performed in the access control system 1 according to the present invention, with reference to the flowchart of FIG. 4.

When the observation computer 6a or the observation computer 6b in the security system 6 detects irregular behavior in the private network (S100), identification information for identifying a computer (i.e., a suspect-terminal) that has conducted the irregular behavior, information indicative of a case of irregular-behavior detection, an email message including control content provided to the suspect-terminal or an edge network device 4 that manages the suspect-terminal are generated (S110). For example, the observation computer 6a or the observation computer 6b generates an email message illustrated in FIG. 5.

The email message generated by the observation computer 6a or the observation computer 6b principally includes a header part and a main-body part. The header part includes information such as: an email address "xxx@aaa.com", which is assigned in advance to the observation computer 6a or the observation computer 6b that sends the email; a sending date/time; an email address "sesc@xxx.com", which is predetermined as a sending-destination; and a title. As a title, a text in an ASCII code, which is converted into from information (e.g., "threat detected") indicative of an irregular state, is written.

In the main-body part of the email, information relating to irregular behavior as well as information for identifying the suspect-terminal such as an authenticated user name, a group name, and an IP address are written. The authenticated user name includes a user name of a user who uses the suspect-terminal. A group name includes a belonging division. An IP address includes an IP address (i.e., a local IP address or a global IP address) of the suspect-terminal. Note that it is sufficient that, as information indicative of a suspect-terminal, an IP address, a MAC address, a computer name, etc., are included. Furthermore, as the information relating to irregular behavior, a URL indicative of access-destination of the suspect-terminal, a category of the URL, a subject-person, a process (e.g., malware infection, a targeted cyber attack, etc.) against which irregular behavior has been detected, data/time information, control content provided to the suspect-terminal or the edge network device 4 that performs communication control of the suspect-terminal are written. Note that the main-body part of the email is written in a character code that is not processable (i.e., impossible to be processed) for the SDN controller 3, e.g., a multi-byte character code such as JIS code or Shift-JIS code.

Furthermore, when an observer (preferably, a security administrator) who operates the observation center computer 6c in the security system 6 recognizes detection of irregular behavior in the private network through a warning sing on the observation center computer 6c, which includes information for identifying a suspect-terminal and information indicative of content of an irregular state (S100), an email message including information for identifying the suspect-terminal, such as an authorized user name, a group name, and an IP address, and information relating to the irregular behavior is generated (S110), similarly to the above description. For example, the observer operates the observation center computer 6c to generate an email message as illustrated in FIGS. 6A through 6F.

FIGS. 6A though 6F are examples of an email message generated by an observer. In FIG. 6A, an IP address (i.e., a local IP address or a global IP address), which is information for identifying a suspect-terminal, and corresponding control content (i.e., "block") are written in the title. In FIG. 6B, a name of a user terminal 5, which is information for identifying a suspect-terminal, and corresponding control content (i.e., "isolate") are written in the title. In FIG. 6C, a name of a user terminal 5, which is information for identifying a suspect-terminal, and corresponding control content (i.e., "unblock") are written in the title. In each of FIGS. 6A through 6C, the main-body part is empty (i.e., NULL). In FIG. 6D, an IP address (i.e., a local IP address or a global IP address), which is information for identifying a suspect-terminal, and corresponding control content (i.e., "block") are written in the main-body part. In FIG. 6E, a name of a user terminal 5, which is information for identifying a suspect-terminal, and corresponding control content (i.e., "isolate") are written in the main-body part. In FIG. 6F, a name of a user terminal 5, which is information for identifying a suspect-terminal, and corresponding control content (i.e., "unblock") are written in the main-body part. Note that, in each of FIGS. 6A through 6F, the header part includes an email address that is assigned to the sender, i.e., the observer who operates the observation center computer 6c, and an email address "sesc@xxx.com" that is predetermined as a sending-destination. An email message to be generated is not limited to one as illustrated in FIGS. 6A through 6F, and any email messages are possible as long as the email message includes information indicative of occurrence of irregular behavior. Further, it is preferable that the email message includes information of a computer (i.e., a suspect-terminal) that has conducted the irregular behavior, information indicative of a communication-destination (or a communication-source) regarding the irregular behavior, etc. Note that "block" is indicative of control content such as discarding a packet or disabling a port. Further, "isolate" is, for example, a process for switching connections from a virtual LAN (VLAN), to which a suspect-terminal has been originally connected, to a specific VLAN such as a VLAN for quarantining.

Note that the email message generated at S110 should at least include information for identifying a suspect-terminal. Further, it is preferable that control content provided to the suspect-terminal or the edge network device 4 that performs communication control of the suspect-terminal is included. In a case where control content is not included in the email message, a control instruction based on a predetermined control content is executed by the suspect-terminal or the edge network device 4. Further, in a case where control content is included in the email message, a control instruction based on the control content is executed by the suspect-terminal or the edge network device 4.

The email message sent from the observation computer 6a, the observation computer 6b, or the observation center computer 6c in the security system 6 is stored in a mailbox of the email server 8, which is the sending-destination.

The SDN controller 3 is provided with a message-obtainment-processing unit (unillustrated), which is email client software. The message-obtainment-processing unit provides a query to the e-mail server 8 to check whether there is an email message. In a case where an email message is stored in the mailbox of the e-mail server 8, the message-obtainment-processing unit obtains the email message. Note that the e-mail server 8 may voluntarily send email messages to the message-obtainment-processing unit, instead of receiving a query from the message-obtainment-processing unit.

In response to obtaining the email message stored in the mailbox of the e-mail server 8, the message-obtainment-processing unit performs conversion into a syslog message that is processable for the SDN controller 3, based on the email message.

Firstly, the message-obtainment-processing unit specifies which security system the email has been sent from, based on sender information in the obtained email. That is to say, regarding current network security, multiple security systems (including programs) are activated in a multi-layered format, and, in a case where irregular behavior of some kind is detected, notification via an email is provided to an administrator from the security system that has detected the irregular behavior. However, content of the email differs depending on systems. Therefore, by specifying which security system the email has been sent from, based on the sender information in the email, it is possible to specify, when generating a below-described syslog message, which information in the syslog message to refer to.

Furthermore, based on the sender information in the obtained email, "MSG identification" information, which is identification information for specifying which security system the email has been sent from, is specified. Note that information of an email address used by a security system is stored in association with corresponding "MSG identification" information.

Figure 5:
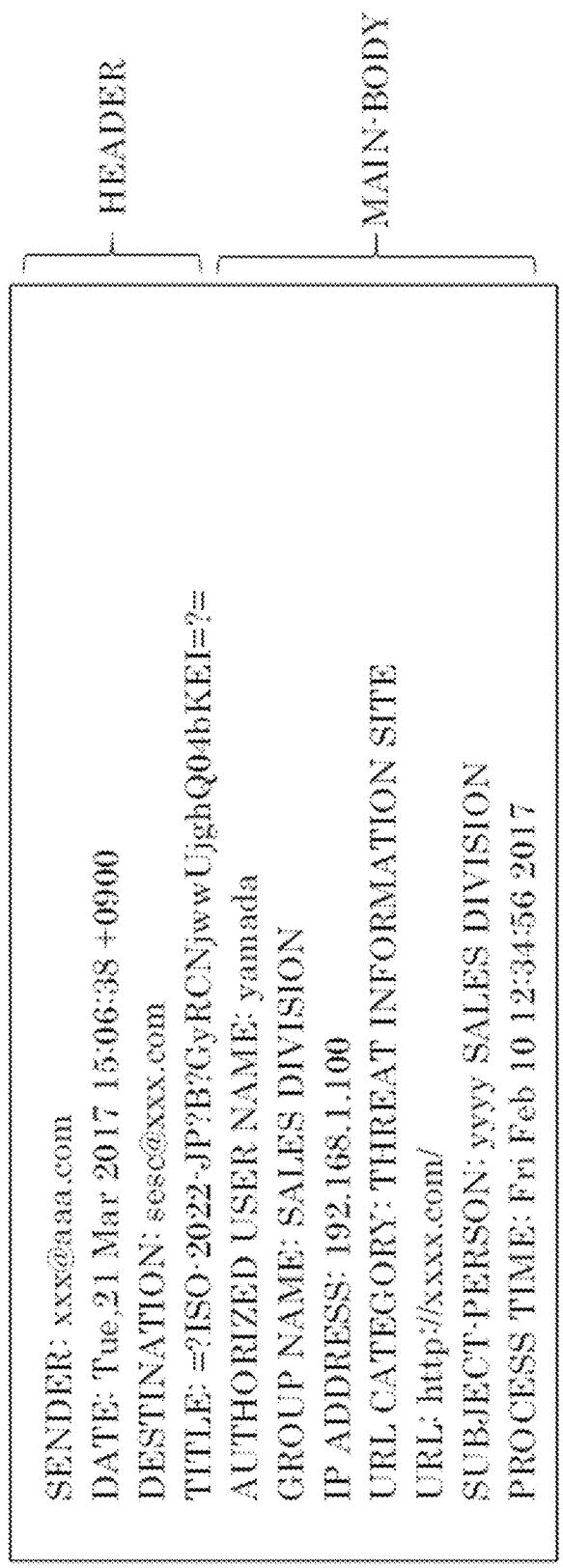
FIG. 5 is a diagram illustrating an example of an email message transmitted by an observation computer.

The message-obtainment-processing unit inserts the "MSG identification" information, which is specified in the above way, into a syslog message. Further, the message-obtainment-processing unit converts the character code of the obtained email message from JIS code or Shift-JIS code to UTF-8 code. Note that, other than UTF-8 code, any codes are possible as long as converting into a code in which the message is processable for the SDN controller 3. Furthermore, a linefeed code in the email message is replace with a delimiter in the syslog message, so as to convert the email message written in multiple lines into the syslog message written in a single line. A delimiter may be a predetermined symbol, such as "|" used in FIGS. 7A and 7B and FIGS. 8A through 8C. Note that, as information unnecessary in the syslog message, the message-obtainment-processing unit may delete information that is not referred to by the SDN controller 3 on the basis of the "MSG identification" information before executing a conversion process of a code and a linefeed code. As described above, the message-obtainment-processing unit executes a process for partially or entirely converting an email message obtained from the e-mail server 8 into a syslog message that is processable for the SDN controller 3 (S120). In FIG. 7A, an example of a syslog message converted from the email message of FIG. 5 is illustrated. Note that, regarding the message-obtainment-processing unit, any formats other than a syslog message may be possible as long as converting into information with which the control instruction is processable (i.e., possible to be processed) for the SDN controller 3.

The message-obtainment-processing unit of the SDN controller 3 sends the syslog message, which has been converted into as described above, to the syslog server 7. Further, the SDN controller 3 provides a control instruction corresponding to the converted message to the suspect-terminal written in the converted message or the edge network device 4 that controls communication of the suspect-terminal. It is preferable that the control instruction includes identification information for identifying a suspect-terminal, such as an IP address, a MAC address, or a computer name, in addition to information indicative of control content such as block of communication or isolation of a suspect-terminal.

That is to say, the SDN controller 3 refers to "MSG identification" information in a syslog message to determine which information in the syslog message to refer to, so as to provide a corresponding control instruction. For example, regarding the syslog message illustrated in FIGS. 7A and 7B, in a case where it is predetermined to refer to information of "Subject", "URL category", and "URL" in the syslog message when "MSG identification" information is "xx_system", the SDN controller 3 firstly refers to the "MSG identification" information in the syslog message to specify the information "xx_system", so as to perform a corresponding process, i.e., to refer to the information of "Subject", "URL category", and "URL" in the syslog message, and then provides a corresponding control instruction. Reference of information based on "MSG identification" information is illustrated in FIG. 7B. Note that "MSG identification" information and information that is referred to in the syslog message may be predetermined in a fixed manner, such as on a table, or may be processed in a variable manner by use of a script.

Furthermore, in a case of a syslog message as illustrated in FIGS. 8A through 8C, "MSG identification" is specified to be "Mail_API". Then, a control instruction for executing a process corresponding to "Mail_API", e.g., a process (e.g., "block", "isolate", or "unblock" to a suspect-terminal having an IP address specified in "Subject", etc.) according to "Subject" and "action", is provided.

Note that the SDN controller 3 specifies a suspect-terminal in a converted message or an edge network device 4 that controls communication of the suspect-terminal at the time of providing a control instruction. Therefore, in a case where an IP address in the message is a global IP address, the SDN controller 3 refers to a NAT/PAT conversion table, which is stored in the gateway 2, etc., so as to specify a corresponding local IP address. In the above way, it is possible to specify the local IP address of the suspect-terminal. Furthermore, in a case where the control instruction is provided to the edge network device 4, the SDN controller 3 specifies the edge network device 4 that controls communication of the suspect-terminal, based on the local IP address of the suspect-terminal. Then, based on the specified IP address of the suspect-terminal or information of the edge network device 4, the control instruction is provided to the suspect terminal or the edge network device 4 that controls communication of the suspect-terminal. Although, in FIG. 5, information indicative of control content provided to a suspect-terminal is not included in the email message, it is possible to provide a setting such as blocking or isolating communication in advance, so as to generate a control instruction on the basis of the setting. Furthermore, in a case where an email message includes information indicative of an irregular state, it is possible to add, to a syslog message, information indicative of control content corresponding to the information indicative of the irregular state, so as to provide a control instruction to a suspect-terminal or an edge network device 4.

Note that, in a case where an email message obtained by the message-obtainment-processing unit of the SDN controller 3 is as illustrated in one of FIGS. 6A through 6F, a process similar to S110 as described above is executed, so as to generate a syslog message as illustrated in one of FIGS. 8A through 8C. In a case of FIG. 6A or 6D, a syslog message as illustrated in FIG. 8A is generated. In a case of FIG. 6B or 6E, a syslog message as illustrated in FIG. 8B is generated. In a case of FIG. 6C or 6F, a syslog message as illustrated in FIG. 8C is generated.

Then, in response to receiving the control instruction, the suspect-terminal or the edge network device 4 that controls communication of the suspect-terminal executes a process of access control against a user terminal 5, which is the suspect-terminal, based on the control instruction (S130). For example, the suspect-terminal is isolated, or communication of the suspect-terminal is blocked. The process of access control against the suspect-terminal may be, for example, a process for isolating the suspect-terminal so as to disable communication of the suspect-terminal. Furthermore, the process of access control against the edge network device 4 may be, for example, a process for overwriting the rule table of the edge network device 4 to add a rule of performing such a process as discarding packets from the suspect-terminal, so as to block communication of the suspect-terminal. Note that the process of access control is not limited to the above.

Second Embodiment

Figure 2:
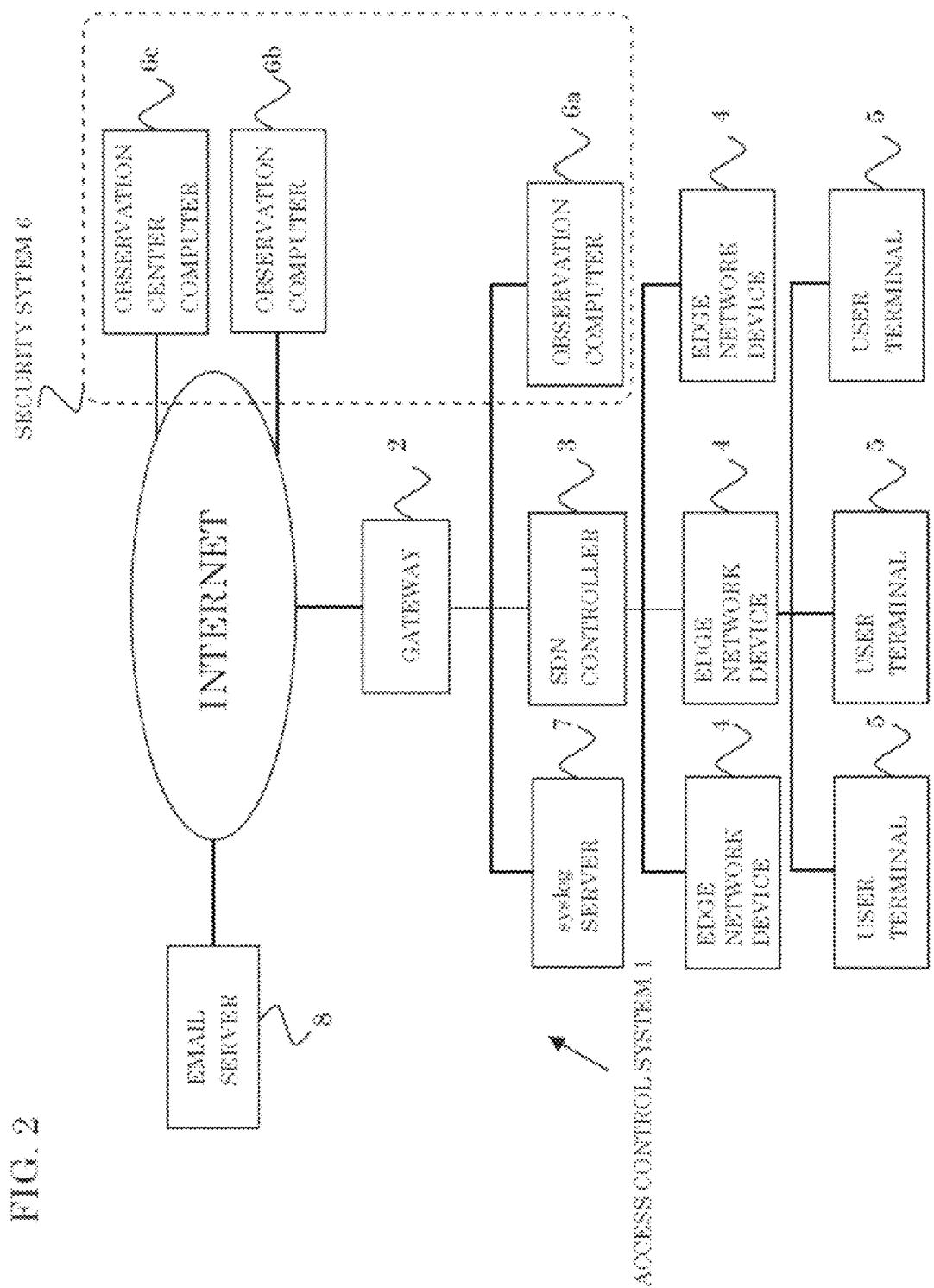
FIG. 2 is a diagram schematically illustrating an example of the entire configuration of the access control system according to the present invention.
Figure 9:
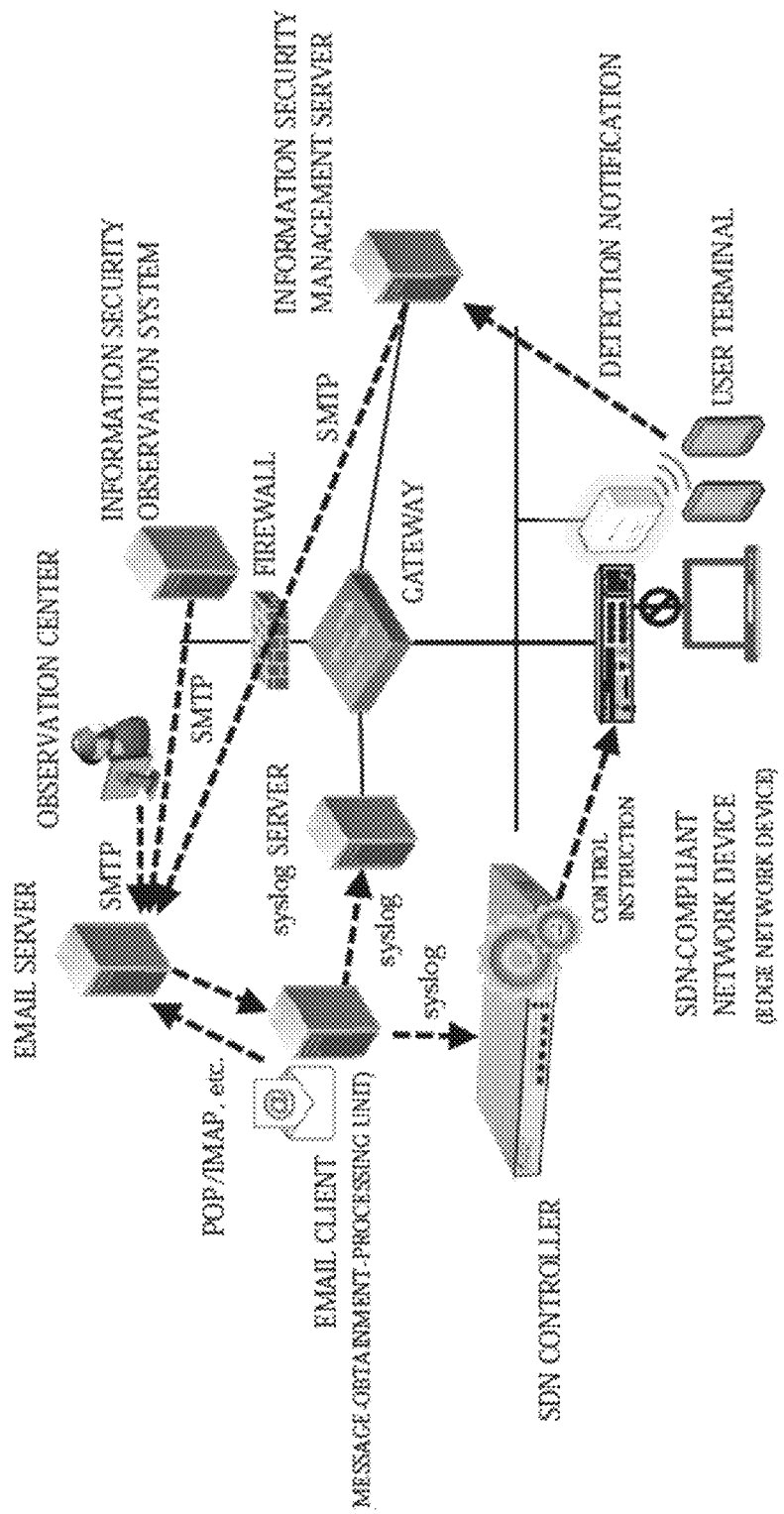
FIG. 9 is a diagram schematically illustrating an example of an overview of the entirety of an access control system according to a second embodiment of the present invention.
Figure 10:
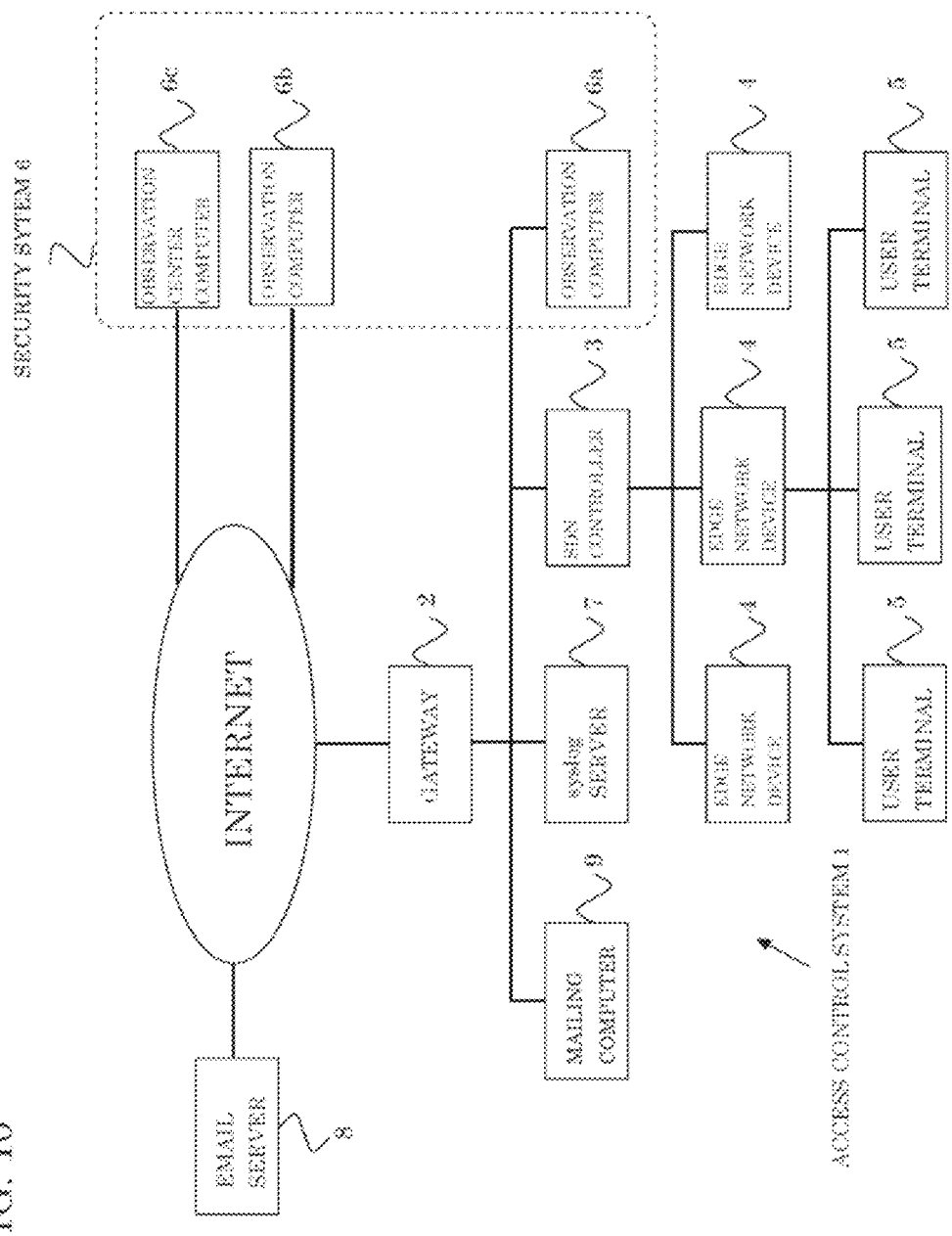
FIG. 10 is a diagram schematically illustrating an example of the entire configuration of the access control system according to the second embodiment of the present invention.

Although a case in which email client software is included in the SDN controller 3 is explained with reference to FIG. 1 and FIG. 2, it is possible that a computer (i.e., a mailing computer 9) other than the SDN controller 3 includes email client software as a message-obtainment-processing unit. An overview of the access control system 1 in this case is schematically illustrated in FIG. 9. Furthermore, the configuration of the access control system 1 according to the second embodiment of the present invention is schematically illustrated in FIG. 10.

In this case, similarly to the first embodiment, the mailing computer 9, which includes the message-obtainment-processing unit, obtains an email message from the e-mail server 8 and converts into a syslog message, based on the email message. Then, the syslog message, which is converted into, is provided to the syslog server 7 and the SDN controller 3.

In response to receiving the syslog message from the mailing computer 9, the SDN controller 3 provides a control instruction to a corresponding edge network device 4, based on the syslog message, similarly to the first embodiment, and executes a process of access control against a user terminal 5, which is a suspect-terminal.

With such a configuration as described above, the SDN controller 3 may not be provided with email client software.

Third Embodiment

In the first embodiment and the second embodiment, a message-obtainment-processing unit in the SDN controller 3 or the mailing computer 9 converts an email message into a syslog message, so as to execute a process. However, in a case where an email message is processable for an edge network device 4, it is possible that the message-obtainment-processing unit directly provides the email message to the edge network device 4.

Fourth Embodiment

Although, in the present specification, a case in which a private network is constituted by use of an SDN is explained, there is no such limitation. That is to say, the private network may be constituted by use of a different network management technology. In this case, the SDN controller 3 and edge network devices 4 respectively function as computers in the network management technology.

Furthermore, instead of an email, it is possible to utilize a messaging service by use of a port that is permitted to pass through a firewall of an organization, etc. In this case, instead of an email, a message of the messaging service is generated and stored in a message server of the messaging service. In the above way, it is possible to achieve a configuration in which application software (i.e., the message-obtainment-processing unit) in the messaging service provided in a computer such as the SDN controller 3, which controls the private network, obtains the message stored in the provided server and converts into information that is processable for the SDN controller 3, so as to provide a control instruction to a suspect-terminal or an edge network device 4.

By use of the access control system 1 according to the present invention, it is possible to provide the access control system 1 in which, in a case of detecting irregular behavior, it is possible to attend to the irregular behavior in a simple way while ensuring security.

What is claimed is:

1. An access control system for performing access control in a private network, the access control system comprising:
   a message-obtainment-processing unit having a processor and memory configured to obtain from a message server a message including information for identifying a suspect-terminal, the message being generated in a security system located inside or outside the private network to be received by the message server,
   wherein the message-obtainment-processing unit causes a computer that controls communication in the private network to provide, to the suspect-terminal or a computer that controls communication of the suspect-terminal, a control instruction based on the obtained message, so as to cause the suspect-terminal or the computer that controls communication of the suspect-terminal to execute a process for access control against the suspect-terminal,
   wherein the message is a message of a messaging service by use of a port that is permitted to pass through a firewall of the private network,
   wherein the private network is constituted by use of a software defined network (SDN),
   wherein the message server is an email server and the message is an email message,
   wherein the computer that controls communication in the private network is an SDN controller and the computer that controls communication of the suspect-terminal is an edge network device,
   wherein the email message is partially or entirely written in a code that is not processable for the SDN controller, and wherein the message-obtainment-processing unit converts the obtained email message into information that is processable for the SDN controller and then causes the SDN controller to provide, to the suspect-terminal or the edge network device, the control instruction corresponding to the information converted into, so as to cause the suspect-terminal or the edge network device to execute the process for access control against the suspect-terminal.

2. The access control system according to claim 1,
wherein the email message further includes information indicative of control content for the process for access control, and
wherein the message-obtainment-processing unit provides, to the suspect-terminal or the edge network device, the control instruction corresponding to the control content.

3. The access control system according to claim 1,
wherein the email message further includes information indicative of an irregular state of the suspect-terminal, and
wherein the message-obtainment-processing unit specifies control content corresponding to the information indicative of the irregular state for the process for access control and provides, to the suspect-terminal or the edge network device, the control instruction corresponding to the control content.

4. The access control system according to claim 1,
wherein, when irregular behavior in the private network is detected, the security system specifies a user terminal that has conducted the irregular behavior as the suspect-terminal and accepts, from a predetermined person who administers the private network, generation of the email message including identification information of the specified suspect-terminal,
wherein the email server stores the email message sent from the security system, and
wherein the SDN controller controls communication in the private network and is provided with the message-obtainment-processing unit configured to obtain the email message stored in the email server.

5. The access control system according to claim 4,
wherein the message-obtainment-processing unit specifies, based on sender information in the obtained email message, the security system from which the email message has been sent,
wherein the message-obtainment-processing unit inserts information for identifying the specified security system into a syslog message, which is converted into based on the email message,
wherein the SDN controller refers to information in the syslog message, based on the information for identifying the security system, the information for identifying the security system being in the syslog message, and
the SDN controller provides the control instruction, based on the referred information.

6. The access control system according to claim 2,
wherein the message-obtainment-processing unit specifies, based on sender information in the obtained email message, the security system from which the email message has been sent,
wherein the message-obtainment-processing unit inserts information for identifying the specified security system into a syslog message, which is converted into based on the email message,
wherein the SDN controller refers to information in the syslog message, based on the information for identifying the security system, the information for identifying the security system being in the syslog message, and
the SDN controller provides the control instruction, based on the referred information.

7. The access control system according to claim 3,
wherein the message-obtainment-processing unit specifies, based on sender information in the obtained email message, the security system from which the email message has been sent,
wherein the message-obtainment-processing unit inserts information for identifying the specified security system into a syslog message, which is converted into based on the email message,
wherein the SDN controller refers to information in the syslog message, based on the information for identifying the security system, the information for identifying the security system being in the syslog message, and
the SDN controller provides the control instruction, based on the referred information.

8. The access control system according to claim 4,
wherein the message-obtainment-processing unit specifies, based on sender information in the obtained email message, the security system from which the email message has been sent,
wherein the message-obtainment-processing unit inserts information for identifying the specified security system into a syslog message, which is converted into based on the email message,
wherein the SDN controller refers to information in the syslog message, based on the information for identifying the security system, the information for identifying the security system being in the syslog message, and
the SDN controller provides the control instruction, based on the referred.

9. A non-transitory computer-readable recording medium storing a computer program that causes a computer to function as a message-obtainment-processing unit having a processor and memory configured to obtain from an email server an email message including information for identifying a suspect-terminal, the email message being generated in a security system located inside or outside a private network, which is constituted by use of an SDN, to be received by the email server, wherein the message-obtainment-processing unit causes an SDN controller in the private network to provide, to the suspect-terminal or an edge network device that controls communication of the suspect-terminal, a control instruction based on the obtained email message, so as to cause the suspect-terminal or the edge network device to execute a process for access control against the suspect-terminal,
wherein the message is a message of a messaging service by use of a port that is permitted to pass through a firewall of the private network,
wherein the email message is partially or entirely written in a code that is not processable for the SDN controller, and
wherein the message-obtainment-processing unit converts the obtained email message into information that is processable for the SDN controller and then causes the SDN controller to provide, to the suspect-terminal or the edge network device, the control instruction corresponding to the information converted into, so as to cause the suspect-terminal or the edge network device to execute the process for access control against the suspect-terminal.

10. An access control method for performing access control in a private network constituted by use of an SDN, the access control method comprising:
- when a security system located inside or outside the private network detects irregular behavior in the private network, specifying a user terminal that has conducted the irregular behavior as a suspect-terminal and generating an email message including identification information of the suspect-terminal;
- storing the generated email message in an email server;
- causing an SDN controller or a predetermined computer, which controls communication in the private network, to obtain the email message stored in the email server;
- partially or entirely converting the obtained email message from a code that is not processable for the SDN controller into information that is processable for the SDN controller;
- providing, from the SDN controller to the suspect-terminal or an edge network device that controls communication of the suspect-terminal, a control instruction corresponding to the information converted into; and
- causing the suspect-terminal or the edge network device to execute a process for access control against the suspect-terminal, based on the control instruction,
- wherein the message is a message of a messaging service by use of a port that is permitted to pass through a firewall of the private network.

* * * * *